United States Patent [19]

Clemens et al.

[11] 4,188,140
[45] Feb. 12, 1980

[54] WELDED JOINT

[75] Inventors: Kurt Clemens, Gummersbach, Fed. Rep. of Germany; Hans Klein, deceased, late of Gummersbach, Fed. Rep. of Germany, by Maria Klein nee Frielingsdorf, heir

[73] Assignee: L. & C. Steinmüller GmbH, Gummersbach, Fed. Rep. of Germany

[21] Appl. No.: 884,593

[22] Filed: Mar. 8, 1978

[30] Foreign Application Priority Data

Mar. 9, 1977 [DE] Fed. Rep. of Germany ....... 2710201

[51] Int. Cl.² .................................................. B25G 3/00
[52] U.S. Cl. ..................................... 403/13; 285/189; 403/272
[58] Field of Search ................. 403/13, 268, 271, 272; 285/21, 22, 189

[56] References Cited

U.S. PATENT DOCUMENTS

| | | | |
|---|---|---|---|
| 2,258,913 | 10/1941 | Stone | 285/22 X |
| 2,914,346 | 11/1959 | Ryder | 285/189 |
| 3,120,400 | 2/1964 | Carpenter | 285/189 X |

*Primary Examiner*—Wayne L. Shedd
*Attorney, Agent, or Firm*—Becker & Becker, Inc.

[57] ABSTRACT

A welded joint between pipes and pressure bearing elements, such as tube plates, pressure tanks, accumulators, or the like. The pipes and elements have a lip-shaped extension in the joint region. The joint connection is effected in this joint region by a full through-weld which is substantially free of crevices. The joint connection of pipe-to-element lies within the region where the pipe penetrates the element. A free space remains below the element lip between the pipe and the element. The space which is located above the element lip, and which is defined or bordered by the element lip, the pipe, and a centering bushing or sleeve known per se, is filled up with welding material. The centering bushing serves only as a temporary aid during the welding operation and is removed, e.g. is bored out, after the welding operation has been completed.

2 Claims, 3 Drawing Figures

WELDED JOINT

The present invention relates to a welded joint between pipes and pressure bearing elements, such as tube sheets or plates, pressure tanks, accumulators, or the like, according to which the pipes and elements, in the region of the joint, have a lip-like construction, and the joint connection is effected in the region of the joint by means of a full through-weld which is substantially free of crevices.

Known mechanical procedures for the gap- or crevice-free welding-in of pipes in tube plates cannot be utilized with thick-walled pipes and pipes which are made of several materials.

Other processes are known for the welded-through, crevice-free joining of pipes to tube plates, but these processes have the disadvantage that the procedures are elaborate and therefore economically unfavorable.

A process is also known for fixing pipes to pressure bearing elements, according to which the joint connection is effected by means of a full, crevice-free through-weld, and according to which the elements in the region of the connection of the pipes have a lip-shaped extension.

Further, a procedure for fixing pipes to pressure bearing elements, such as tube plates, pressure tanks, accumulators, and the like, is known and is characterized in that, after insertion of a pipe which is provided on its outer and inner side with a lip, the outer lip of the pipe is connected with the lip of the element by means of a full through-weld. Subsequently, a centering bushing is inserted into the pipe and is braced in the end region of the pipe with the latter. Thereafter, the free space between the outer surface of the centering bushing and the inner surface of the bore of the element is filled up with welding material. This filling up is carried on only after the upwardly adjoining space has been defined by a fixed boundary.

With the procedures described above, a relatively large amount of welding material is required. It is therefore an object of the present invention, while basically using the above described procedure, to create conditions for a welding joint which requires only a small amount of welding material.

This object and other objects and advantages of the present invention will appear more clearly from the following specification in connection with the accompanying drawing, in which.

The welded joint pursuant to the present invention is characterized primarily in that the joint connection of pipe-to-element lies within the region where the pipe penetrates the element. The present invention is further characterized in that, below the element lip, between the pipe and the element, a free space remains, and in addition, the space which is located above the element lip and is formed by the element lip, the pipe, and a centering bushing or sleeve known per se, is filled up with welding material. The joint connection area is preferably provided within the region where the pipe penetrates the element, but in the upper region thereof.

By this displacement of the connection point to the upper region of the pipe penetration, the space located above the element lip, and formed by this lip, the pipe, and a centering bushing known per se, becomes smaller, thereby reducing the amount of welding material which is required. Due to the change of position of the welding joint, a free space is advantageously obtained below the element lip between the pipe and the element; this space prevents crevice corrosion.

Figure 1:
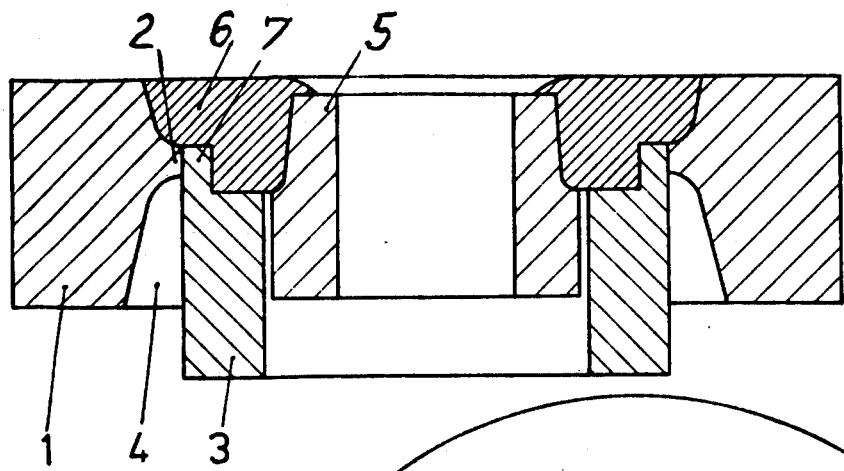
FIG. 1 shows an intermediate phase of the welded joint pursuant to the present invention, with the centering bushing still present.
Figure 2:
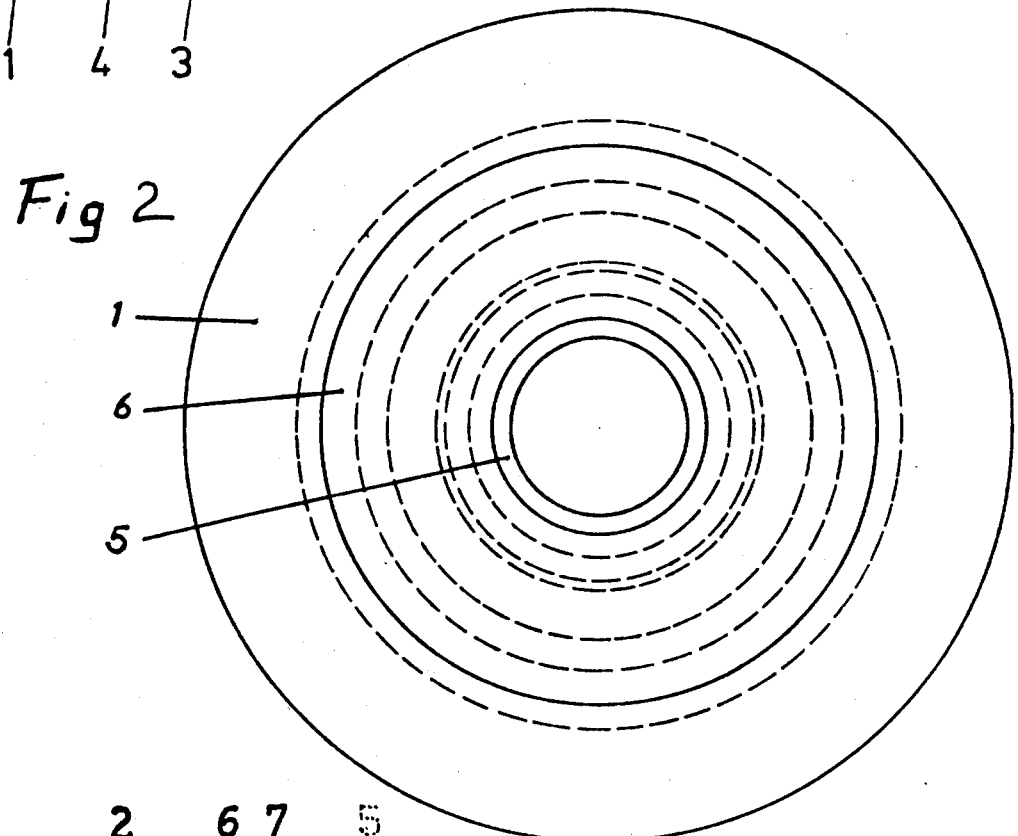
FIG. 2 is a top view of FIG. 1.
Figure 3:
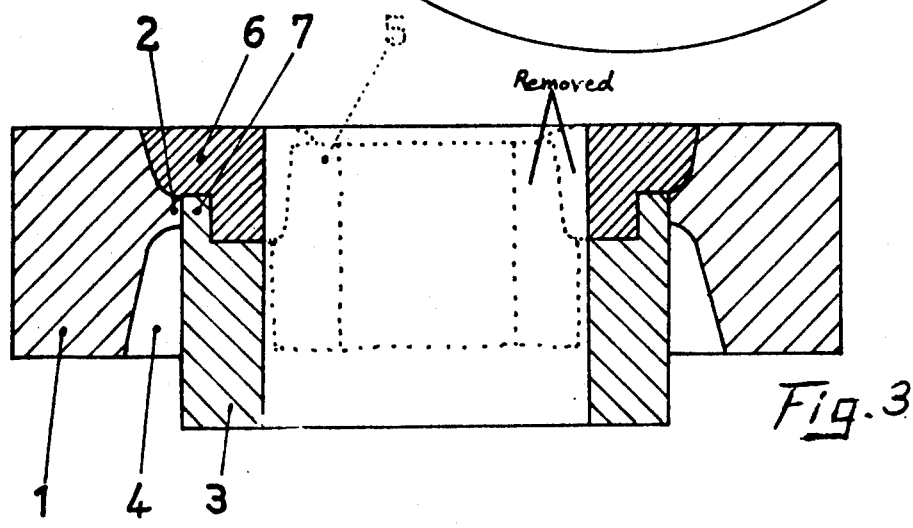
FIG. 3 shows the finished welded joint pursuant to the present invention, with the centering bushing bored out.

Referring now to the drawing in detail, the pipe 3 penetrates the tube sheet or plate 1. The lip 2 of the tube plate 1 abuts the lip 7 of the pipe 3. A free space 4 is formed below the lip 2 and between the tube plate 1 and the pipe 3. The centering bushing or sleeve 5 is positioned within the pipe 3 as an auxiliary aid in the formation of the welded joint. As shown in FIG. 1, the space formed above the lip 2 and between the tube plate 1 and the bushing 5 is filled in with welding material 6. As shown in FIG. 3, after the welded joint is formed, the bushing 5, along with excess welding material, is removed, for example by boring, so that the bore of the pipe 3 is free along its entire length.

The present invention is, of course, in no way limited to the specific showing of the drawing, but also encompasses any modifications within the scope of the appended claims.

What we claim is:

1. A welded joint between the end of a tube and a wall, comprising: a wall having an opening with a radial, circumferential lip between the inner and outer surfaces of said wall to provide circumferential recesses between said lip and the opposite surfaces of said wall, the outer end of said tube fitting in said lip with its end terminating at the edge of said lip, said end of said tube having a circumferential, internal recess to provide a thin lip on the end of said tube fitting in said lip on said wall, said lip on said tube being of greater length axially than the width of said lip on the wall, welding material filling the space in said opening formed by the recess in the end of said tube and the recess in said wall beyond said tube, said welding material having an interior surface forming a continuation of the interior surface of said tube, the tube being spaced from said wall on the other side of the lip on the wall.

2. The method of securing a tube to a wall in which the wall has an opening for receiving the end of said tube, said opening in said wall having a radial, circumferential lip between the outer and inner surfaces of said wall to provide circumferential recesses between said lip and the opposite surface of said wall, and said tube has its end fitting in said lip with its end terminating at the edge of said lip, said end of said tube having a circumferential, internal recess to provide a thin lip on the end of said tube fitting in said lip in said wall, said lip on said tube being of greater length axially than the width of said lip on the wall, the method comprising inserting a bushing in the end of said tube, said bushing having a reduced end which with the recess in said end of said tube and recess in the wall beyond said tube form a circumferential space, filling said space with welding material so as to fill the recess in the end of said tube and the recess in said wall beyond the end of said tube, and removing said bushing and the welding material inward of the inner surface of said tube to form a bore in said welding material as a continuation of the inner surface of said tube, said welding material securing the lip of said tube to the lip of said wall.

* * * * *